United States Patent [19]

Bettcher

[11] 4,439,924

[45] Apr. 3, 1984

[54] ROTARY HAND KNIFE

[75] Inventor: Louis A. Bettcher, Amherst, Ohio

[73] Assignee: Bettcher Industries, Inc., Birmingham, Ohio

[21] Appl. No.: 318,386

[22] Filed: Nov. 5, 1981

[51] Int. Cl.[3] .............................................. A22C 17/04

[52] U.S. Cl. ........................................ 30/276; 17/1 G

[58] Field of Search .................... 30/276, 347; 17/1 G

[56] References Cited

U.S. PATENT DOCUMENTS

| | | | |
|---|---|---|---|
| Re. 25,947 | 12/1965 | Bettcher | 30/276 |
| 3,688,403 | 9/1972 | Bettcher | 30/276 |
| 3,852,882 | 12/1974 | Bettcher | 30/276 |
| 4,166,317 | 9/1979 | Bettcher | 30/276 |
| 4,170,063 | 10/1979 | Bettcher | 30/276 |
| 4,175,321 | 11/1979 | Bettcher | 30/276 |
| 4,178,683 | 12/1979 | Bettcher | 30/276 |
| 4,198,750 | 4/1980 | Bettcher | 30/276 |
| 4,236,531 | 12/1980 | McCullough | 30/276 |
| 4,363,170 | 12/1982 | McCullough | 30/276 |

*Primary Examiner*—Jimmy C. Peters

*Attorney, Agent, or Firm*—Watts, Hoffmann, Fisher & Heinke

[57] ABSTRACT

An improved hand knife 20 of the type used for trimming meat with a rotary driven ring-like blade 34 guided by a ring-like housing 30. The blade is retained by a partial peripheral flange 90 of the housing and a pivoted retaining shoe 36 secured to the knife hand piece 22. A securing screw 40 and an adjustable abutment 80 retain and position the shoe against the blade. The arrangement allows convenient blade changing.

19 Claims, 10 Drawing Figures

ROTARY HAND KNIFE

DESCRIPTION

1. Technical Field

This invention relates to an improved hand knife of the type used for trimming meat with a rotary driven ring-like blade, and to an improved blade housing, blade and mechanism for retaining the blade.

2. Background Art

Rotary knives with ring-like power-driven blades of the type pertaining to this invention are exemplified by such structures as shown in U.S. Pat. Nos. Re. 25,947 and 4,175,321. Such knives have a rotary ring-like or annular blade, generally frusto-conical in form, sharpened at one axial end and incorporating gear teeth to form a ring gear portion at the other axial end. The ring gear portion is located and guided by a ring-like housing that is secured to a handle. The blade is driven by a pinion carried by the handle. A flexible cable driven by an external motor, or an air motor incorporated into the handle, drives the pinion.

In constructions such as those shown in U.S. Pat. Nos. Re. 25,947, and 4,175,321, an arm-like sector portion extends around one side of the blade and housing, to support a blade-retaining shoe held in place by several securing screws and located by stop screws. The shoe is clamped directly against the blade, squeezing it slightly against the housing to retain it. The operations required for the release or removal and subsequent readjustment of the blade-retaining shoe for blade changing discourage blade substitution during use of the knife, such as during a work shift; yet, cutting efficiency depends upon use of a sharp blade. Also, dull blades result in waste product because deeper cuts are required to get the blade started into the meat. Because of the difficulty in replacing blades during a work shift, an operator will typically only apply a sharpening steel to the blade while using the knife, in an attempt to maintain sharpness. After a day of use, or sometimes more, the retaining shoe will be removed and the blade sharpened or replaced, typically by shop or maintenance personnel. Unfortunately, steeling of a blade does not maintain or produce an optimum cutting edge and substantially greater efficiency is achieved if a properly sharpened blade is substituted every two to four hours of use.

To permit blade removal and to keep the profile or cross sectional area of the housing small in the part of the housing that extends from the handle and passes through the product being cut, the housing was not constructed to restrain movement of the blade in an axial direction away from the housing, reliance being instead upon the retaining shoe adjacent the handle. As long as the knife was pushed against a product or pulled substantially parallel with the surface of a product, this was satisfactory, but on occasions the knife is urged in a direction away from the surface during cutting, in which case the part of the blade beyond the retaining shoe tends to be pulled from the housing. This may result in loss of control of the depth of the cut as well as mechanical difficulties.

DISCLOSURE OF THE INVENTION

The present invention provides an improved rotary knife having a new and improved blade housing, blade, and blade-retaining shoe construction that overcome the above disadvantages and permit convenient removal and replacement of the blade without removal of shoe retaining screws, or the shoe itself, or other parts of the knife from the handle, and additionally retain the blade in an improved manner.

The knife of the present invention comprises a handle, a ring-like blade housing removably attached to the handle, a frusto-conical ring blade located and guided for rotation by the housing, and a blade-retaining plate adjustably and removably held against the housing and blade. The blade has gear teeth that form a ring gear portion adjacent the housing, a beveled or frusto-conical outer periphery about the ring gear portion against which blade-retaining surfaces of the knife act, and a circular cutting edge that extends forwardly from the housing. The blade is driven by a pinion in the handle, engaged with the ring gear portion. In use, a portion of the blade and housing is moved through a work body and cut product passes through the central open part of the blade and housing. The particular embodiment disclosed herein is used primarily to trim fat or skin from the surface of meat.

The improved knife construction has a circular blade housing with a partial peripheral flange that captures a circumferential portion of the blade farthest from the handle to restrain axial movement of the blade. The flange extends circumferentially a distance no greater than 180 angular degrees about the blade. The remainder of the housing provides a flat annular support surface against which the ring gear portion of the blade slides during rotation. The flanged part of the housing has a thin profile that forms a partial frusto-conical extension of the blade at the ring gear portion and is very little thicker than the blade, to pass in use with minimum resistance between the product and a slice being cut by the knife.

The knife handle has an arcuate end with an arm-like sector portion extending from one side about a portion of the housing. A plate-like blade-retaining shoe extends along the arcuate end of the handle and is pivotably attached at one end to the end of the sector portion. An inside arcuate beveled edge of the shoe engages the outer beveled surface of the blade, and a flat face surface of the shoe is positioned against the unflanged portion of the housing adjacent to the knife handle. The beveled edge retains the blade within the housing flange and against the unflanged part of the housing. A securing member carried with the handle cooperates with the shoe to hold it against the housing while allowing pivotal movement of the shoe in the plane of the shoe for adjustment toward or away from the blade periphery. The securing member also readily releases the shoe to allow the shoe to swing about its pivotal attachment to a position away from the housing, allowing the blade to be moved toward the handle, out of captured relationship with the peripheral housing flange, for removal. An adjustable abutment carried by the handle engages an outer edge of the shoe when the shoe is in blade-retaining position. Through hand-adjustment, the abutment can be moved to pivot the shoe about its attached end to locate and retain the inside beveled edge of the shoe against the outer frusto-conical peripheral surface of the ring gear part of the blade, with adequate frictional contact to hold the blade in operating position relative to the housing, yet sufficiently free to rotate. With this construction and arrangement, a blade can be removed, a new blade installed and the shoe properly located quickly and easily by an operator without the use of tools. Any play that may develop between the blade and the housing or shoe can be removed by hand adjustment of the abutment.

As suggested by the foregoing, the present invention provides a hand knife for cutting meat and the like comprising a handle, a ring-like blade housing at one end of the handle, a continuous ring blade supported and guided for rotation by said housing, a blade retainer secured to the handle and located to engage an outer surface of the blade, and means to locate the retainer against the blade, said housing having an annular radial face and said blade having one axial end that is located and guided by said face and a portion that extends from the face and terminates in a circular cutting edge, and said housing having an arcuate wall that extends axially from the radial face in the direction said blade portion extends and peripherally about said radial face, said arcuate wall including a lip directed radially inward of the housing, that extends no more than 180 angular degrees and located peripherally remote from the blade retainer, and that restrains axial movement of the blade relative to said radial face.

The above and other features and advantages of the invention will be better understood from the detailed description that follows.

BRIEF DESCRIPTION OF THE DRAWINGS

The details of the invention will be described in connection with the accompanying drawings, in which.

BEST MODE FOR CARRYING OUT THE INVENTION

Figures 1, 10:
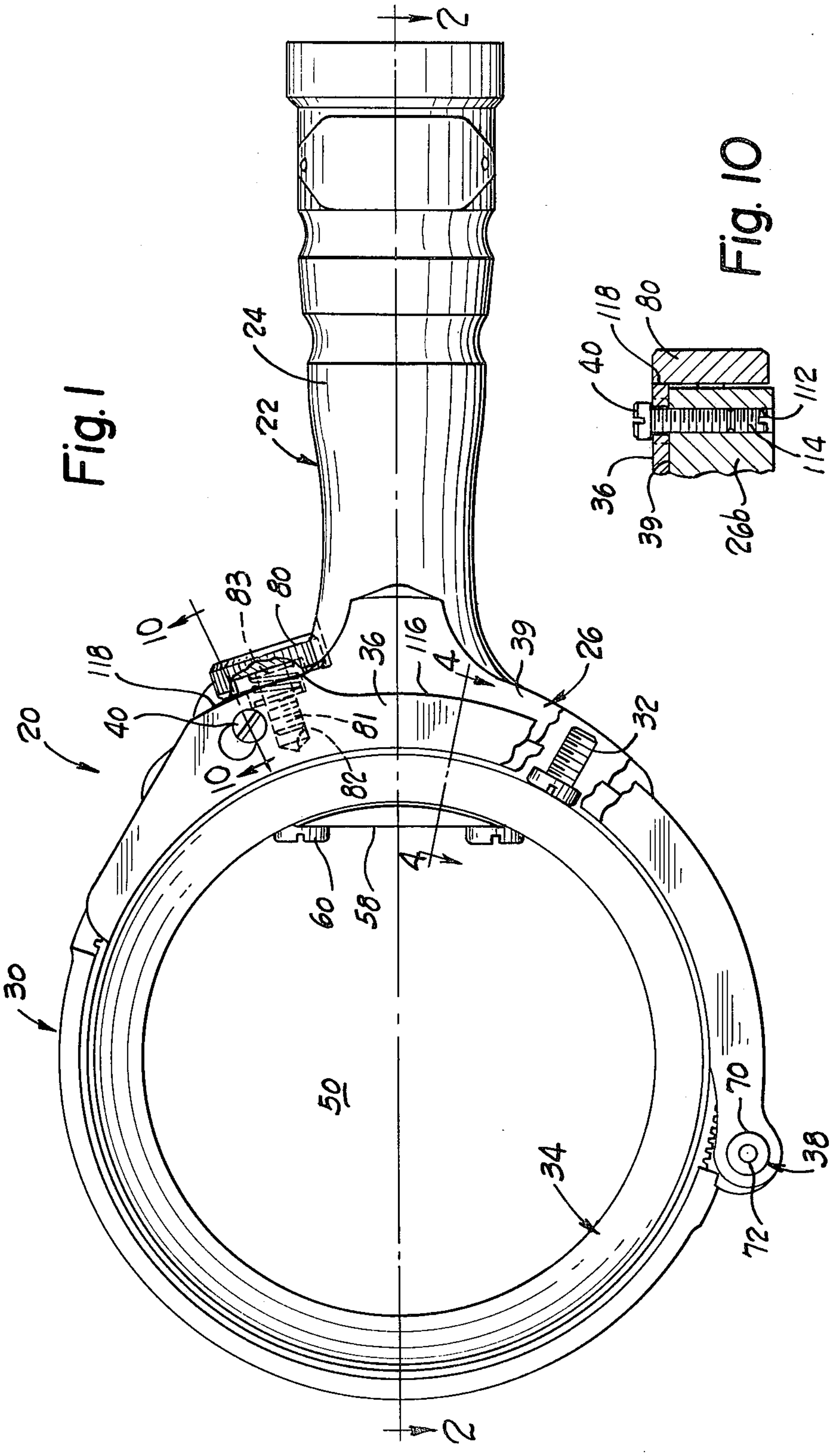
FIG. 1 is a front elevational view of the hand knife embodying the present invention, with parts broken away.
FIG. 10 is a partial sectional view taken along the line 10—10 of FIG. 1.
Figure 2:
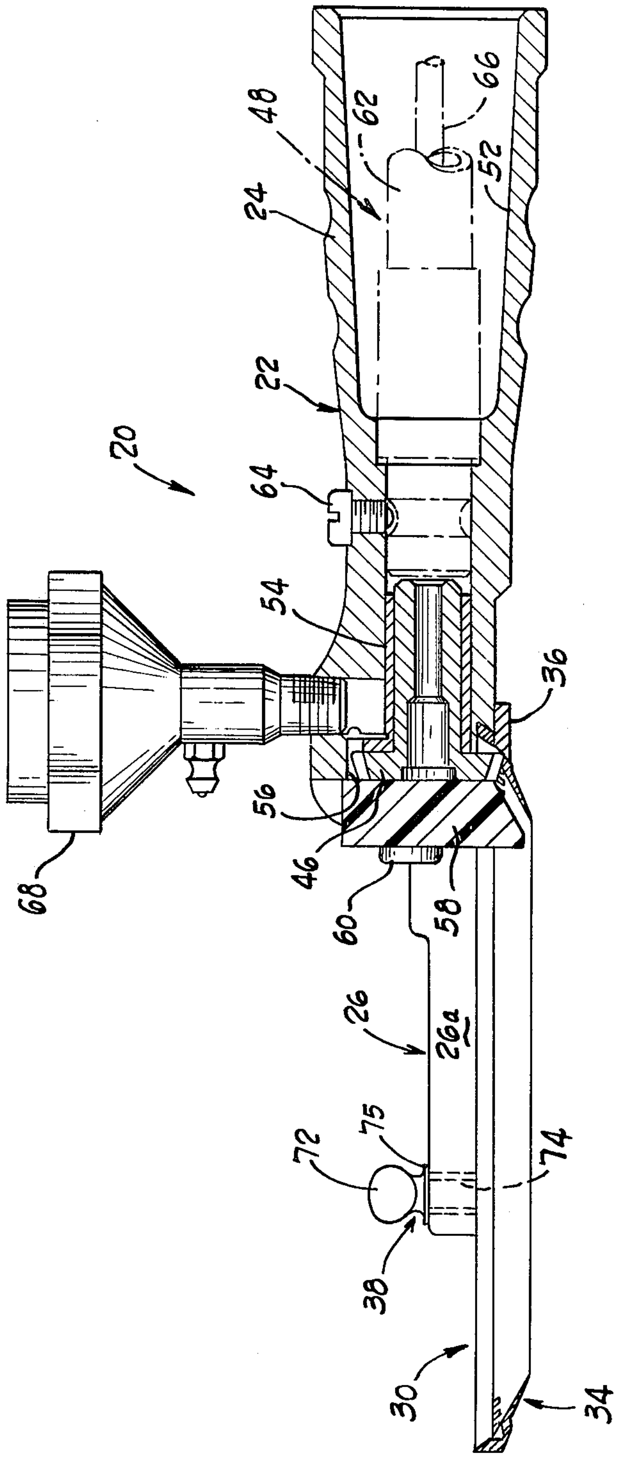
FIG. 2 is a longitudinal sectional view of the hand knife of FIG. 1 taken along the line 2—2.
Figure 3:
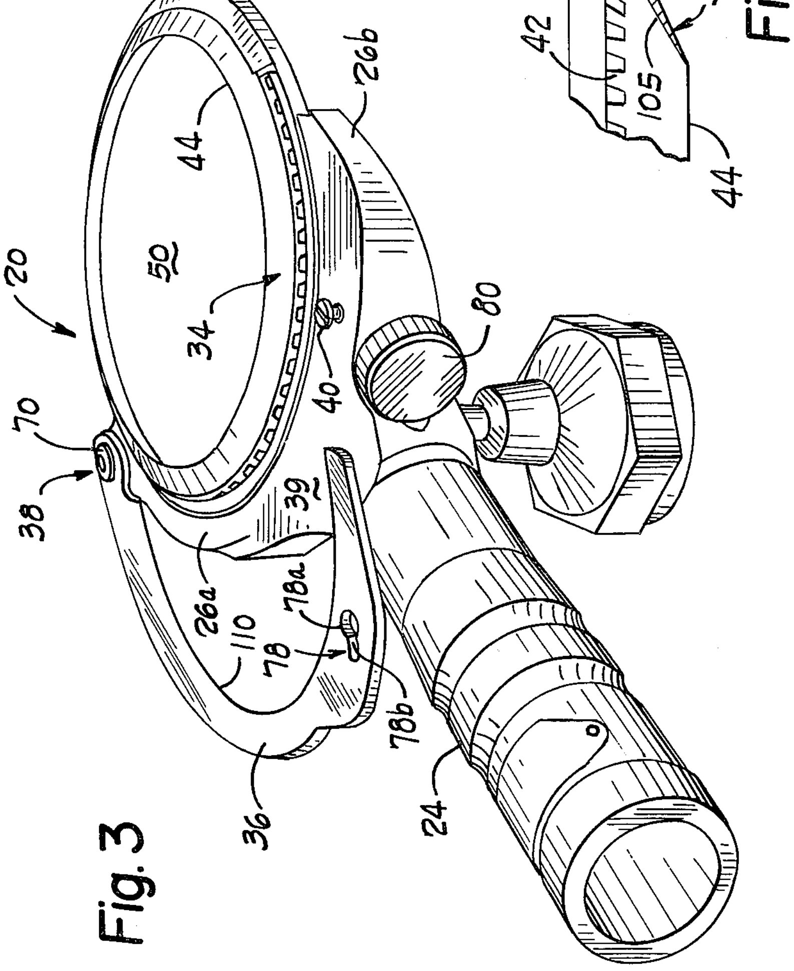
FIG. 3 is a perspective view of the hand knife of FIG. 1.
Figure 4:
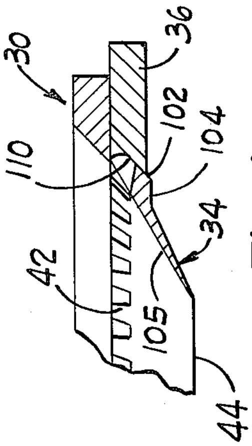
FIG. 4 is a partial sectional view taken along the line 4—4 of FIG. 1.

A hand knife 20 embodying the invention is best shown in FIGS. 1-3 and comprises a hand piece 22 having a tubular handle 24 and an arcuate end 26 including arm-like sector portions **26*a*, 26*b* (portion 26*a* being longer in the preferred embodiment); a ring-like housing 30 secured to the sector portions of the hand piece by two screws 32; a ring-like annular blade 34 rotatable relative to the housing; and a retaining shoe 36 connected to the hand piece by a pivot connection 38 and secured in a blade-retaining position against a front face 39 of the hand piece by a headed screw 40 in the sector portion 26*b*. The blade 34 is located and guided in rotation by both the housing 30 and the shoe 36**.

Both the housing 30 and blade 34 are of short axial length relative to their diameters. The blade is frustoconical in shape, with gear teeth 42 at the axial end of larger diameter, which is received against the housing, and has a cutting edge 44 formed at the other and smaller axial end, which extends axially from the general plane of the housing 30 and forms the front of the knife 20.

A power driven pinion gear 46 in the hand piece 22 engages the gear teeth 42 and rotates the blade relative to the housing. The pinion is driven by a rotated cable 48 powered by an external electric motor (not shown). Alternatively, the pinion can be powered by an air driven motor and gearing within the tubular handle part 24.

In use, the blade 34 is rotated at a relatively high speed and the face of the knife (i.e., the cutting edge 44) is placed against a product, and the knife is drawn along the product in the direction of the handle, toward the operator, pulling part of the blade and housing that are remote from the handle through the product. A resulting slice of the product passes through the central opening 50 of the housing and blade. The construction and shape of the blade and housing facilitate cutting thin layers from the product; for example, patches of skin or thin layers of fat from the surface of a meat product.

As best illustrated in FIG. 2, the hand piece 22 is a metal casting and the tubular handle part 24 has a central recess 52. A flanged tubular bushing 54 is located at the arcuate end of the hand piece. The pinion gear 46 is rotatably supported in the bushing and received in a recess 56 in the arcuate end of the hand piece. A plastic cover 58 is secured to the hand piece by screws 60 to cover the pinion gear 46. A flexible cable sheath 62 is received in the tubular handle part 24 and secured within the handle by a screw 64. A central cable 66 is rotatably housed by the sheath 62 and is secured to the pinion gear 46 to drive the gear when the cable is rotated by an electric motor (not shown). A grease reservoir 68 on the hand piece communicates with the pinion to provide lubrication.

The pivot conenction 38 at the end of the sector portion **26*a* is comprised of an internally threaded bushing 70 secured to one end of the retaining shoe 36, and a thumb screw 72. The bushing extends through a hole 74 through the sector and the thumb screw 72 that is received in the bushing has a shoulder 75 that acts against the sector portion 26*a* on the opposite side from the retaining shoe so the screw draws the shoe against the hand piece. Loosening of the thumb screw 72 allows the retaining shoe to be pivoted about the axis of the screw and also allows the shoe to move away from the front face 39** of the hand piece.

The securing screw 40 in the front face of the sector portion **26*b* secures the distal end of the shoe 36 by cooperating with a keyhole slot 78** in the shoe. The slot is elongated in a direction that allows the shoe to pivot a short distance toward and away from the blade while the screw is received in the slot.

A hand wheel 80 with a shaft 81 is received in a threaded aperture 82 in the sector portion **26*b*. The hand wheel acts as an abutment to the shoe 36 for adjusting and maintaining the position of the shoe relative to the blade. A spring 83 surrounding the shaft 81 and acting against the hand wheel and sector portion 26*b*** holds the hand wheel in adjusted position.

Figure 5:
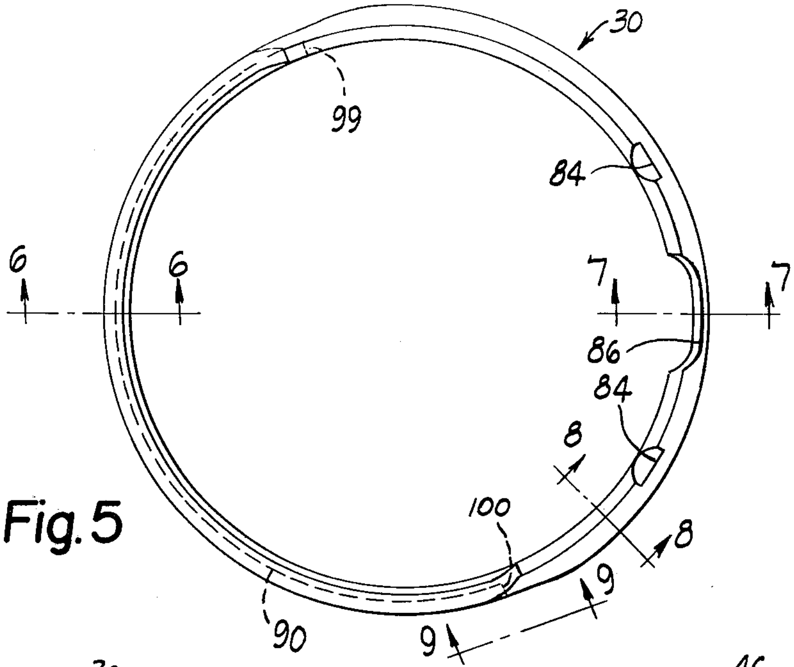
FIG. 5 is a plan view of a housing of the hand knife of FIG. 1.

The blade housing 30 is circular in shape, as best shown in FIG. 5, and has varying cross sectional shapes at different portions, as illustrated by FIGS. 6 to 9. The heads of the two securing screws 32 fit against flats 84 in the inside periphery of the housing, the screws being received in threaded apertures in the arcuate end 26 of the hand piece. The housing has a cut away portion 86 between the flats 84 to receive the pinion gear 46, allowing it to cooperate with the gear teeth of the blade 34. The housing has a radial face 88 at the front, against which the blade 34 is located and against which it slides in rotation. The radial face varies in width circumferentially of the housing, being wider in that portion of the housing adjacent the arcuate end 26 of the hand piece, and being thinner along that part of the housing that extends beyond the arcuate end 26 of the hand piece. This can be appreciated by comparing the narrow width of the housing shown in FIG. 6 with the greater widths shown in FIGS. 7 and 8.

Figure 6:
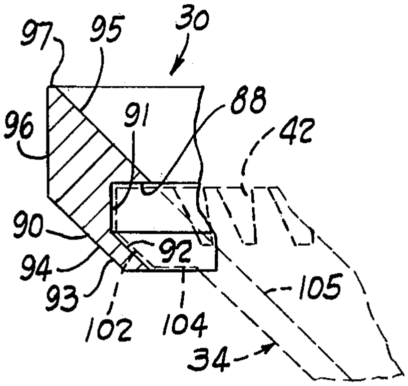
FIG. 6 is a partial sectional view taken along 6—6 of FIG. 5.
Figure 9:
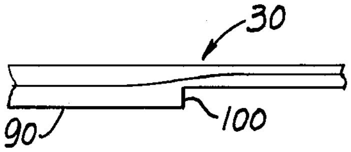
FIG. 9 is a partial side elevational view taken approximately from the plane 9—9 of FIG. 5.
Figure 8:
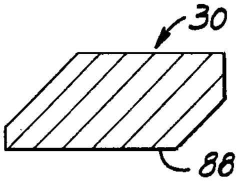
FIG. 8 is a partial sectional view taken along the line 8—8 of FIG. 5.

A peripheral flange 90 extends about the radial face 88 in that portion of the housing that extends beyond the arcuate end 26 (i.e., beyond the sector portions ***26a*, *26b*). The circumferential extent of the peripheral flange is no more than 180° about the housing. The flange includes a cylindrical inside surface portion 91 and a frusto-conical inside surface 92 of an inturned lip 93. The outer surface 94 of the flange is also frusto-conical and is parallel with a frusto-conical back surface 95 of the housing (FIG. 6). The two parallel frusto-conical outside surfaces 94, 95 are joined at the outside periphery of the housing by a cylindrical surface 96 and a very thin flat annular surface 97 that avoids a sharp edge. Ends 99, 100 of the peripheral flange are shown in FIGS. 3, 5 and 9, and in the preferred embodiment are substantially diametrically opposite each other and directly adjacent the ends of sector portions *26a*, *26b***.

Figure 7:
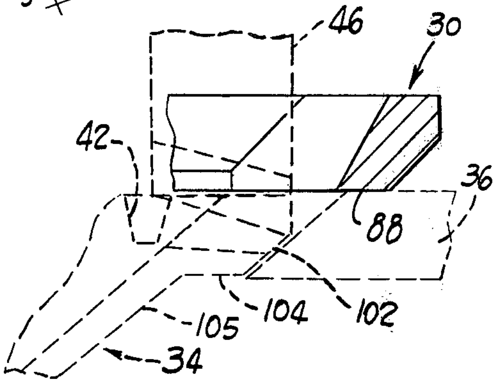
FIG. 7 is a partial sectional view taken along the line 7—7 of FIG. 5.

The blade 34 is located with the gear teeth portion 42 against the radial face 88 of the housing, and in part captured by the peripheral flange 90. The outer peripheral surface of the blade has a frusto-conical portion 102 about the gear teeth portion 42, which is the thickest portion of the blade. The frusto-conical portion 102 ends in a radial flange surface 104, where the thickness of the blade narrows from that of the teeth portion to a thinner part 105 that terminates in the cutting edge 44. The frusto-conical portion 102 rides against the inside surface 92 of the inturned lip 93, while the gear teeth portion 42 rides against the radial face 88 and the cylindrical surface 96 of the housing. As best shown in FIG. 7, the retaining shoe 36 rests against the radial face 88 of the housing and also against the outer frusto-conical surface 102 of the blade.

As shown in FIG. 6, the distance between the frusto-conical surfaces 94 and 95 of the housing is not substantially greater than the thickness of the gear teeth portion 42 of the blade, and those housing surfaces extend at substantially the same angle as the blade. As a result, the flanged portion of the housing extends from the blade at the gear teeth end in a way that does not interfere with the passage of the blade through the product being sliced, due to an absence of any greatly increased thickness or peripherally extending housing surfaces of significant width.

The retaining shoe 36 is in the form of an arcuate plate substantially congruent with and overlying the front face 39 at the arcuate end 26 of the hand piece 22. An inner edge 110 of the shoe is beveled to correspond with the frusto-conical peripheral surface portion 102 of the blade and is shaped to the same radius of curvature so it bears against that blade portion when positioned with the center of curvature coincident with that of the blade center. In such a position, the keyhole slot 78 receives the headed securing screw 40. An enlarged portion *78a* of the keyhole slot is larger than the head of the securing screw 40, and a narrower portion *78b* receives the shank of the screw 40 when the shoe is located to contact the blade. In that position, the head of the screw prevents movement of the shoe away from the front face 39 of the handpiece. Loosening of the thumb screw 74 at pivot 38 permits movement of the shoe toward and away from the face of the hand piece to allow movement of the shoe over the head of the securing screw 40 and then allows the shoe to pivot away from the arcuate end 26, as shown in FIG. 3. As shown in FIG. 10, the securing screw 40 is adjustable in a threaded bore 112 in the sector portion *26b*. A set screw 114 in the threaded bore adjacent the opposite face of the hand piece locates the securing screw and establishes the distance between the front face 39 of the hand piece and the set screw head, so the shoe is closely received in the gap between the front face and the head of the screw 40.

An outer edge 116 of the shoe 36 has a lobe 118 providing a wider part of the shoe that extends beyond the sector portion *26b* and is engaged by the hand wheel 80. Once the screw 40 is received in the keyhole slot 78, the hand wheel is adjusted to hold the shoe with a narrower portion of the slot under the screw head. Also, the hand wheel forces the inside beveled edge of the shoe against the blade, holding the blade in captured relationship to the housing flange 90. Any play between the blade and the housing flange is taken up by adjustment of the hand wheel, which also applies proper force to allow rotation of the blade relative to the housing.

To remove the blade from the housing, the hand wheel is rotated to back it away from the shoe, allowing the shoe to be pivoted about the pivot assembly 38, bringing the enlarged portion of the slot into alignment with the screw head. The thumb screw 72 is then loosened and the shoe is moved away from the front face of the hand piece, beyond the screw, and is then pivoted away from the blade to a position shown in FIG. 3. The blade can then be moved out of the peripheral flange 90, toward the handle part 24 and lifted away from the housing and hand piece. A new blade is inserted by reversing the procedure. In this way, an operator can readily change blades without the use of tools or complex adjustments and frequent blade change is thereby encouraged and greater cutting efficiency achieved.

While a preferred embodiment of the invention have been described with particularity, it will be understood that modifications can be made therein without departing from the spirit and scope of the invention set forth in the appended claims.

I claim:

1. A hand knife for cutting meat and the like comprising a handle, a ring-like blade housing at one end of the handle, a continuous ring blade supported and guided for rotation by said housing, a blade retainer secured to the handle and located to engage an outer surface of the blade, and means to locate the retainer against the blade, said housing having an annular radial face and said blade having one axial end that is located and guided by said face and a portion that extends from the face and terminates in a circular cutting edge, and said housing having an arcuate wall that extends axially from the radial face in the direction said blade portion extends and peripherally about said radial face no more than 180 angular degrees and located peripherally remote from the blade retainer, said arcuate wall including a lip directed radially inward of the housing that restrains axial movement of the blade relative to said radial face.

2. A hand knife for cutting meat and the like comprising a handle, a ring-like blade housing at one end of the handle, a continuous ring blade supported and guided for rotation by said housing, a blade retainer pivotably secured to the handle and located to engage an outer surface of the blade, and means to locate the retainer against the blade, said housing having an annular radial face and said blade having one axial end that is located and guided by said face and a portion that extends from the face and terminates in a circular cutting edge, and said housing having an arcuate wall that extends axially from the radial face in the direction said blade portion extends and peripherally about said radial face no more than 180 angular degrees and located peripherally remote from the blade retainer, said arcuate wall including a frusto-conical portion directed radially inward of the housing that restrains axial movement of the blade relative to said radial face.

3. A hand knife for cutting meat and the like comprising a handle, a ring-like blade housing at one end of the handle, a continuous ring blade supported and guided for rotation by said housing, a blade retainer pivotably secured to the handle and located to engage an outer surface of the blade, and means to locate the retainer against the blade, said housing having an annular radial face and said blade having one axial end that is located and guided by said face and a portion that extends from the face and terminates in a circular cutting edge, and said housing having an arcuate wall that extends axially from the radial face in the direction said blade portion extends and peripherally about said radial face no more than 180 angular degrees and located peripherally remote from the blade retainer, said arcuate wall including a frusto-conical portion directed radially inward of the housing that restrains axial movement of the blade relative to said radial face, said blade retainer comprised of an arcuate-shaped plate with an inner beveled edge having a radius of curvature approximating that of the outer surface of the blade so the edge can bear against the blade, a length that extends fewer than 180 angular degrees about the housing, and pivotable about an axis perpendicular to the plane of said radial face into and out of engagement with an outer surface of the blade adjacent said face.

4. A hand knife for cutting meat and the like comprising a handle, a ring-like blade housing at one end of the handle, a continuous ring blade supported and guided for rotation by said housing, a blade retainer pivotably secured to the handle and located to engage an outer surface of the blade, and means to locate the retainer against the blade, said housing having an annular radial face and said blade having one axial end that is located and guided by said face and a portion that extends from the face and terminates in a circular cutting edge, and said housing having an arcuate wall that extends axially from the radial face in the direction said blade portion extends and peripherally about said radial face no more than 180 angular degrees and located peripherally remote from the blade retainer, said arcuate wall including a frusto-conical portion directed radially inward of the housing that restrains axial movement of the blade relative to said radial face, said blade retainer comprised of an arcuate-shaped plate with an inner beveled edge having a radius of curvature approximating that of the outer surface of the blade so the edge can bear against the blade, a length that extends fewer than 180 angular degrees about the housing, and pivotable about an axis perpendicular to the plane of said radial face into and out of engagement with an outer surface of the blade adjacent said face, said means to locate the retainer against the blade including a securing surface spaced in the axial direction of the blade from the plane of the radial face and an adjustable abutment surface movable in the plane of said plate, said means being engaged with said plate when the plate is located against the blade.

5. A hand knife for cutting meat and the like comprising a handle, a ring-like blade housing at one end of the handle, a continuous ring blade supported and guided for rotation by said housing, a blade retainer pivotably secured to the handle and located to engage an outer surface of the blade, and means to locate the retainer against the blade, said housing having an annular radial face and said blade having one axial end that is located and guided by said face and a portion that extends from the face and terminates in a circular cutting edge, and said housing having an arcuate wall that extends axially from the radial face in the direction said blade portion extends and peripherally about said radial face no more than 180 angular degrees and located peripherally remote from the blade retainer, said arcuate wall including a frusto-conical portion directed radially inward of the housing that restrains axial movement of the blade relative to said radial face, said blade retainer comprised of an arcuate-shaped plate with an inner beveled edge having a radius of curvature approximating that of the outer surface of the blade so the edge can bear against the blade, a length that extends fewer than 180 angular degrees about the housing, pivotable about an axis perpendicular to the plane of said radial face into and out of engagement with an outer surface of the blade adjacent said face, and having a keyhole slot adjacent a distal end, said means to locate the retainer against the blade including an adjustable screw with a head forming a securing surface spaced in the axial direction of the blade from the plane of the radial face, said screw being receivable in the keyhole slot, and an adjustable abutment surface movable in the plane of said plate, said screw and abutment surface being engaged with said plate when the plate is located against the blade.

6. A hand knife for cutting meat and the like comprising a handle, a ring-like blade housing at one end of the handle, a continuous ring blade supported and guided for rotation by said housing, a blade retainer pivotably secured to the handle and located to engage an outer surface of the blade, and means to locate the retainer against the blade, said housing having an annular radial face and said blade having one axial end that is located and guided by said face and a portion that extends from the face and terminates in a circular cutting edge, and said housing having an arcuate wall that extends axially from the radial face in the direction said blade portion extends and peripherally about said radial face no more than 180 angular degrees and located peripherally remote from the blade retainer, said arcuate wall including a frusto-conical portion directed radially inward of the housing that restrains axial movement of the blade relative to said radial face, said blade retainer comprised of an arcuate-shaped plate with an inner beveled edge having a radius of curvature approximating that of the outer surface of the blade so the edge can bear against the blade, a length that extends fewer than 180 angular degrees about the housing, and pivotable about an axis perpendicular to the plane of said radial face into and out of engagement with an outer surface of the blade adjacent said face, said means to locate the retainer against the blade including a securing surface spaced in the axial direction of the blade from the plane of the radial face and an adjustable abutment surface carried on a threaded shaft received in the handle, movable in the plane of said plate by rotating the shaft, said securing and abutment surfaces being engaged with said plate when the plate is located against the blade.

7. A hand knife for cutting meat and the like comprising a handle, a ring-like blade housing at one end of the handle, a continuous ring blade supported and guided for rotation by said housing, a blade retainer pivotably secured to the handle and located to engage an outer surface of the blade, and means to locate the retainer against the blade, said blade having gear teeth formed at one axial end of the blade and a cutting edge formed on the other axial end, the outer periphery of the blade about the portion in which the gear teeth are formed being frusto-conical in shape, said one axial end being located and guided by said face and said other axial end extending from the face and said housing having an annular radial face against which said one axial end of the blade is guided and an arcuate wall that extends axially from the radial face in the direction said blade extends and peripherally about said radial face no more than 180 angular degrees and located peripherally remote from the blade retainer, said arcuate wall including a frusto-conical portion directed radially inward of the housing that engages the said frusto-conical outer periphery of the blade and restrains axial movement of the blade relative to said radial face, said blade retainer comprised of an arcuate-shaped plate with an inner beveled edge having a radius of curvature approximating that of the outer surface of the blade so the edge can bear against said frusto-conical outer periphery of the blade, a length that extends fewer than 180 angular degrees about the housing, and pivotable about an axis perpendicular to the plane of said radial face into and out of engagement with an outer surface of the blade adjacent said face.

8. For use in a hand knife of the type having a rotary ring blade for cutting meat and the like, a ring-like housing adapted to be secured at one portion to a handle and to guide a continuous ring blade in rotational movement relative to the housing, said housing having an annular radial face against which a blade can slide, an arcuate wall that extends from the plane of said face and peripherally about said face no more than 180 angular degrees and that includes an integral fixed lip directed radially inward of the housing in spaced opposition to the radial face.

9. For use in a hand knife of the type having a rotary ring blade for cutting meat and the like, a ring-like housing adapted to be secured at one portion to a handle and to guide a continuous ring blade in rotational movement relative to the housing, said housing having an annular radial face against which a blade can slide, an arcuate wall that extends from the plane of said face and peripherally about only a portion of said face and that forms a frusto-conical lip in spaced opposition to the radial face.

10. For use in a hand knife of the type having a rotary ring blade for cutting meat and the like, a ring-like housing adapted to be secured at one portion to a handle and to guide a continuous ring blade in rotational movement relative to the housing, said housing having an annular radial face against which a blade can slide, an arcuate wall that extends from the plane of said face and peripherally about only a portion of said face and that forms a frusto-conical lip in spaced opposition to the radial face, the part of said housing along which the lip extends having axially spaced frusto-conical surfaces of substantially equal slope.

11. For use in a hand knife of the type having a rotary ring blade for cutting meat and the like, a ring-like housing adapted to be secured at one portion to a handle and to guide a continuous ring blade in rotational movement relative to the housing, said housing having an annular radial face against which a blade can slide, an arcuate wall that extends from the plane of said face and peripherally about only a portion of said face and that forms a frusto-conical lip in spaced opposition to the radial face, the part of said housing along which the lip extends having axially spaced frusto-conical surfaces of substantially equal slope and a cylindrical surface connecting between outer peripheries of the frusto-conical surfaces.

12. For use in a hand knife of the type having a ring-like blade housing and used for cutting meat and the like, a ring-like blade frusto-conical in shape with gear teeth formed in a larger diameter axial end of the blade and a cutting edge formed on a smaller diameter axial end, an outer peripheral portion of the blade adjacent and partially including the gear teeth being frusto-conical for cooperating with opposing frusto-conical retaining surfaces of a hand knife to locate the blade axially and radially relative to a blade housing while allowing rotation.

13. For use in a hand knife of the type having a ring-like blade housing and used for cutting meat and the like, a ring-like blade with one axial end of larger diameter than the other, the larger end having gear teeth formed therein and the other smaller end having a cutting edge, an outer frusto-conical peripheral bearing surface adjacent the larger end and encompassing a peripheral portion of the gear teeth for cooperating with an opposing beveled arcuate retaining surface of a hand knife to retain the blade for rotation in a desired axial position relative to the housing.

14. For use in a hand knife of the type having a rotary ring blade for cutting meat and the like and in which a ring-like housing is secured to a handle to guide the blade in rotational movement and the handle has an arcuate portion to which the housing is secured: a blade-retaining wear shoe arcuate in shape and extending in length fewer than 180 angular degrees and having flat opposite faces one of which faces the handle in use, and an inside edge surface between the two faces beveled in a direction such that one face is narrower than the opposite face, an aperture at one end about which the shoe can be secured for pivoting in the planes of the faces, a lobe on the outer edge extending radially and adapted to project beyond an overlying portion of the handle in use, to be engaged by a movable adjustment surface, and a key-hole type slot through said shoe at a location remote from said aperture and adjacent to said lobe adapted to receive a retaining screw and oriented to allow pivotal movement of said shoe about said aperture when the retaining screw is received in the aperture.

15. For use in a hand knife of the type having a rotary ring blade for cutting meat and the like, a hand piece for supporting a ring-like housing and a blade retaining shoe, said hand piece having a generally elongated handle adapted to be grasped by an operator in use, an arcuate end comprised of portions projecting from the handle in opposite directions forming surfaces against which the ring-like housing is secured and forming a planar surface against which the blade-retaining shoe is supported, one of said portions having an end constructed to pivotally support the shoe, and an adjustable stop secured to the other of said portions and having a surface extending transversely of and beyond said planar surface and movable toward and away from the portion to which it is secured.

16. A hand piece as set forth in claim 15 wherein said other portion of the arcuate end has a threaded bore opening through a surface transverse to said planar surface, and wherein said adjustable stop is a hand-operable screw that is received in the threaded bore and that carries the transverse surface for movement toward and away from the said other portion when the screw is rotated.

17. A hand knife for cutting meat and the like comprising a handle, a ring-like blade housing at one end of the handle, a continuous ring blade supported and guided for rotation by said housing, a movable blade retainer secured to the handle and located to engage a surface of the blade and means to locate the retainer against the blade, said housing having an annular radial face and said blade having one axial end that is located and guided by said face and a portion that extends from the face and terminates in a circular cutting edge, and said housing having a wall that extends axially from the radial face in the direction said blade portion extends and peripherally about said radial face, said wall including an integral fixed lip that is directed radially inward of the housing, that extends peripherally no more than 180 angular degrees and located peripherally remote from the blade retainer and that restrains axial movement of the blade relative to said radial face.

18. A hand knife as set forth in claim 17 wherein said blade retainer engages an outer surface of the blade.

19. For use in a hand knife of the type having a rotary ring blade for cutting meat and the like, a ring-like blade housing adapted to be secured at one portion to a handle and to guide a continuous ring blade in rotational movement relative to the housing, said housing having an annular radial face against which a blade can slide, an arcuate wall that extends axially from the radial face in the direction said blade portion extends, and a lip integral with and fixed relative to the wall directed radially inward of the housing and extending peripherally about said radial face no more than 180 angular degrees for restraining axial movement of the blade relative to said radial face and located peripherally remote from said portion of the housing adapted to be secured to a handle.

* * * * *